US011252740B2

(12) United States Patent
Taneja et al.

(10) Patent No.: US 11,252,740 B2
(45) Date of Patent: Feb. 15, 2022

(54) CONTROLLING COMMUNICATIONS IN HETEROGENEOUS NETWORKS

(71) Applicant: Cisco Technology Inc., San Jose, CA (US)

(72) Inventors: Mukesh Taneja, Bangalore (IN); Brian Hart, Sunnyvale, CA (US); Sudhir Jain, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/576,155

(22) Filed: Sep. 19, 2019

(65) Prior Publication Data

US 2021/0092752 A1     Mar. 25, 2021

(51) Int. Cl.
*H04W 72/12*     (2009.01)
(52) U.S. Cl.
CPC ... *H04W 72/1215* (2013.01); *H04W 72/1278* (2013.01)
(58) Field of Classification Search
CPC ......... H04W 72/1215; H04W 72/1278; H04W 88/08; H04W 36/08; H04W 36/14; H04W 36/24; H04W 36/245; H04W 36/30; H04W 48/18; H04W 48/20; H04W 16/14; H04W 24/02; H04W 24/04;
(Continued)

(56) References Cited

U.S. PATENT DOCUMENTS 9,088,995 B2    7/2015   Novak et al.
9,794,870 B2 * 10/2017   Vannithamby ........ H04W 48/18
(Continued)

FOREIGN PATENT DOCUMENTS

EP             3030040 A1    6/2016
WO    WO-2011119750 A1 * 9/2011  ......... H04W 72/0426
(Continued)

OTHER PUBLICATIONS

E. Khorov and D. Bankov, "Performance evaluation of Real Time Communications over Wi-Fi" contribution IEEE 802.11-18/1946r4—Mar. 2019.
PCT Notification of Transmittal of the International Search Report and the Written Opinion of the International Searching Authority, or the Declaration with attached International Search Report and Written Opinion of the International Searching Authority in International Application No. PCT/US2020/050934, dated Nov. 26, 2020, 13 pages.

*Primary Examiner* — Un C Cho
*Assistant Examiner* — Lalita W Pace
(74) *Attorney, Agent, or Firm* — Baker Botts, LLP

(57) ABSTRACT

A first wireless access point uses a first radio access technology in a heterogeneous wireless network. The heterogeneous wireless network includes the first wireless access point and a second wireless access point using a second radio access technology. The first wireless access point determines one or more performance characteristics of traffic management and traffic between a first client device and the first wireless access point using the first radio access technology and the second wireless access point using the second radio access technology. The first wireless device (access point or some other network device) calculates one or more traffic indicators based on these performance characteristics. The first wireless device further communicates at least one of the one or more traffic indicators to the second wireless access point. The communicated traffic indicators are for use by the second wireless access point to schedule radio resources of the second RAT.

26 Claims, 5 Drawing Sheets

(58) Field of Classification Search
CPC ........... H04W 28/0231–0242; H04W 28/0808;
H04W 28/0812; H04W 28/0815; H04W
28/0819; H04W 28/0823; H04W 28/0835;
H04W 28/0958; H04W 56/001; H04W
56/0015; H04W 56/002; H04W 56/0025;
H04W 72/0426; H04W 72/0486; H04W
72/08; H04W 72/085; H04W 72/1226;
H04W 72/1231; H04W 74/04; H04B
7/024

See application file for complete search history.

(56) References Cited

U.S. PATENT DOCUMENTS

| | | | |
|---|---|---|---|
| 11,019,534 B2* | 5/2021 | Garcia-Saavedra | ......................... H04L 5/0007 |
| 2009/0268684 A1* | 10/2009 | Lott | .................... H04W 72/087 370/329 |
| 2012/0275428 A1* | 11/2012 | Feng | .................... H04L 5/0064 370/330 |
| 2013/0114524 A1* | 5/2013 | Sirotkin | ............... H04B 7/0626 370/329 |
| 2014/0192744 A1* | 7/2014 | Zhou | .................... H04B 7/0626 370/329 |
| 2015/0092573 A1* | 4/2015 | Zhang | .................... H04W 24/10 370/252 |
| 2015/0103657 A1* | 4/2015 | Henderson | ........ H04W 28/0284 370/232 |
| 2016/0057687 A1* | 2/2016 | Horn | .................... H04W 36/28 370/331 |
| 2016/0087877 A1* | 3/2016 | Ryu | ...................... H04W 76/16 370/329 |
| 2016/0219616 A1* | 7/2016 | Ni | ......................... H04L 1/0026 |
| 2016/0374136 A1 | 12/2016 | Moisio et al. | |
| 2017/0142742 A1 | 5/2017 | Fischer et al. | |
| 2018/0020376 A1* | 1/2018 | Belghoul | ............... H04W 16/14 |
| 2018/0249493 A1* | 8/2018 | Sun | .................... H04W 72/1231 |
| 2018/0270679 A1 | 9/2018 | Laselva et al. | |
| 2020/0107386 A1* | 4/2020 | Van Phan | ................. H04L 1/08 |

FOREIGN PATENT DOCUMENTS

| | | |
|---|---|---|
| WO | 2018 226065 A1 | 12/2018 |
| WO | 2019 108123 A1 | 6/2019 |

\* cited by examiner

CONTROLLING COMMUNICATIONS IN HETEROGENEOUS NETWORKS

TECHNICAL FIELD

Certain embodiments of the present disclosure relate, in general, to wireless communications systems, and, in particular, to communications in heterogeneous networks.

BACKGROUND

Wireless networks may employ multiple radio access technologies (RATs) to provide access to wireless resources to a variety of wireless devices in different contexts. Such networks may be referred to as hybrid or heterogeneous networks. In some cases, a network may include 5G New Radio (5G NR), or Long Term Evolution (LTE) wireless RAT and another wireless RAT, such as Wi-Fi, e.g., according to an 802.11ax or 802.11be (Extremely High Throughput, EHT) standard. Some applications will require the use of multiple RATs in the network. Those applications may also have end-to-end requirements on latency, jitter, availability, reliability, survival time, update time, and/or service bit rate.

BRIEF DESCRIPTION OF THE DRAWINGS

For a more complete understanding of the disclosed embodiments and their features and advantages, reference is now made to the following description, in conjunction with the accompanying drawings, in which.

DESCRIPTION OF EXAMPLE EMBODIMENTS

Overview

Figure 1A:
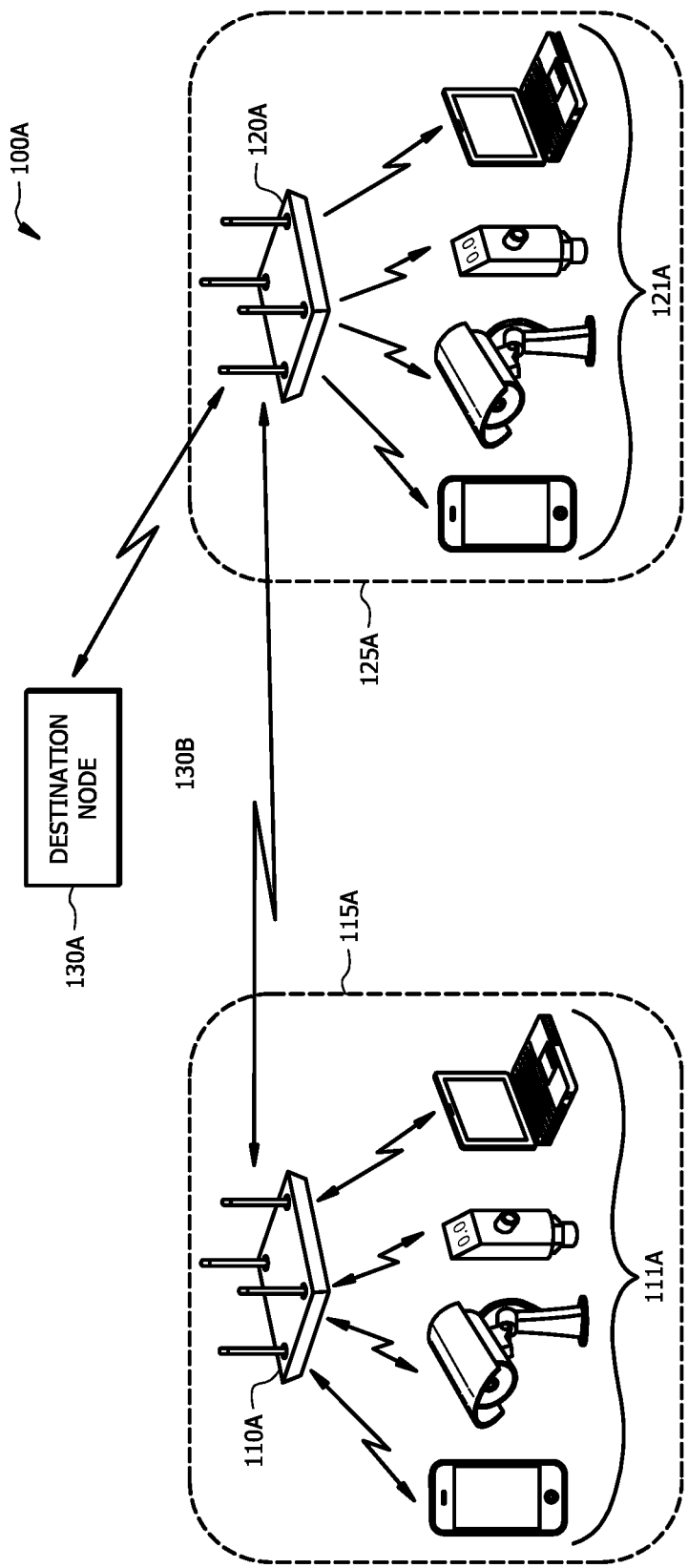
FIGS. 1A and 1B illustrate example heterogeneous wireless network configurations, in accordance with certain embodiments.

According to an embodiment, a method is provided for a first wireless access point using a first radio access technology in a heterogeneous wireless network. The heterogeneous wireless network includes the first wireless access point and a second wireless access point using a second radio access technology. The method includes determining one or more performance characteristics of traffic management and traffic between a first client device and the first wireless access point using the first radio access technology and the second wireless access point using the second radio access technology. The method further includes calculating one or more traffic indicators based on the characteristics of the traffic management and the traffic of the first client device. The method further includes communicating at least one of the one or more traffic indicators to the second wireless access point. The communicated traffic indicators are for use by the second wireless access point to schedule radio resources of the second RAT.

One or more embodiments provided in this disclosure may include one or more technical advantages or solutions to existing technical problems. For example, certain embodiments improve the reliability and/or performance of communications through multi-radio access technologies (RATs) networks by determining traffic management characteristics in one RAT for use by an access point in another RAT to schedule resources for the multi-RAT traffic. As a result, the scheduling of resources may be made by the second access point that can account for the scheduling and reliability of the first access point. In this manner, predetermined quality and/or reliability requirements may be more easily met, thereby reducing latency, increasing data rates, and/or ensuring a higher level of reliability for the multi-RAT communications. As another example, one or more traffic indicators may be determined by an access point, wherein the one or more traffic indicators indicate performance characteristics of traffic management (such as the scheduler at access point) and traffic of a client device involving more than one RAT. The indicators may be determined based on the characteristics of both what has been scheduled for the client device and what was requested (or required by the quality of service, QoS, or data requirements). In this manner, the performance characteristics of the traffic management may be adequately captured and indicated to the other access point in the other RAT, which may have more flexibility and/or resources to address any inadequacies or limitations of the first RAT.

Certain embodiments may have none, some, or all of the above-recited advantages. Other advantages may be readily apparent to one having skill in the art in light of the present disclosure.

EXAMPLE EMBODIMENTS

Embodiments of the present disclosure and its advantages are best understood by referring to FIGS. 1 through 6 of the drawings, like numerals being used for like and corresponding parts of the various drawings. Although certain embodiments may be described in reference to particular illustrated examples, the disclosure herein is not limited to the particular illustrated embodiments and/or configurations and includes any and all variants of the illustrated embodiments and any and all systems, methods, or apparatuses consistent with the teachings of this disclosure, as understood by a person having ordinary skill in the art.

Figure 1B:
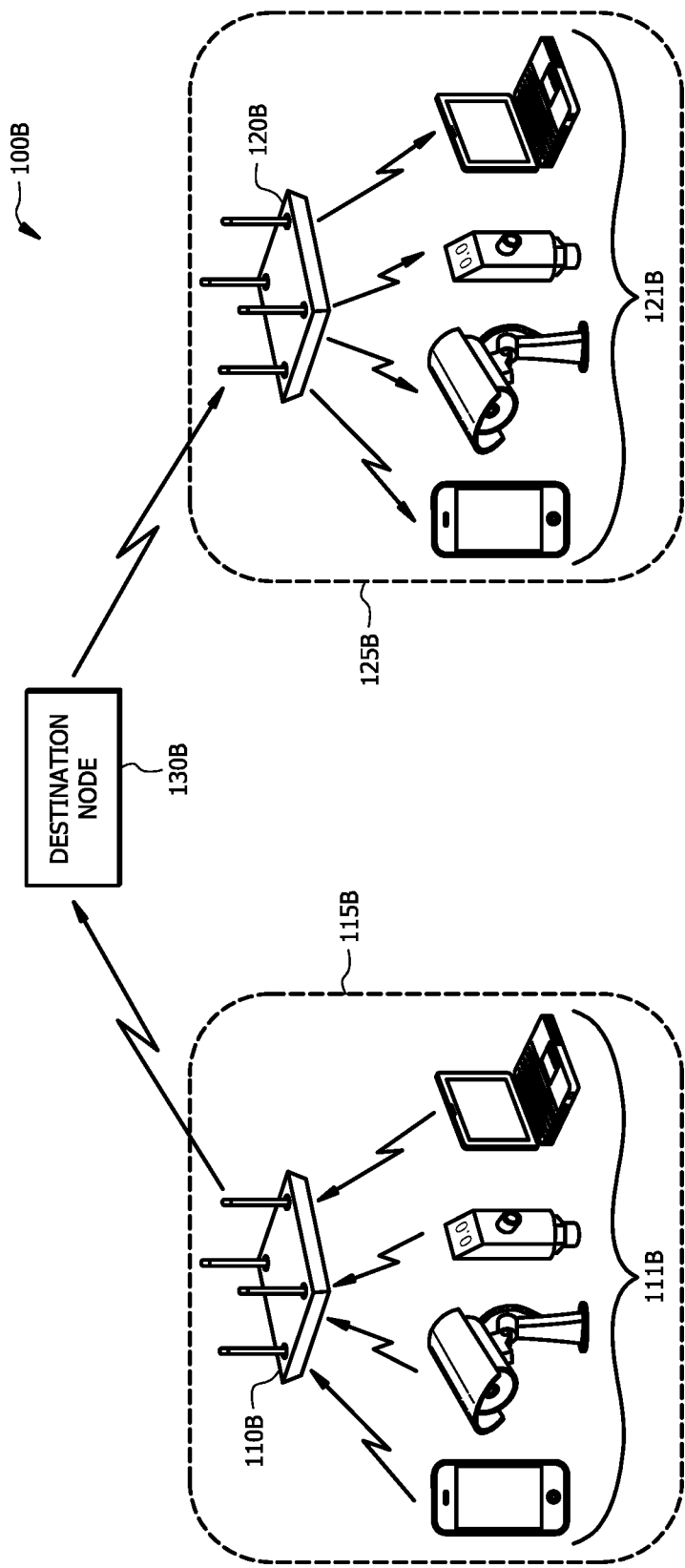

Applications may be implemented on heterogeneous wireless networks using multiple RATs. For example, there are several situations where 5G New Radio (5G-NR) and Wi-Fi (e.g., 802.11ax or 802.11be i.e. extremely high throughput (EHT)) systems are expected to be used in the same network. In particular, certain industrial applications require devices and networks using both Wi-Fi (or upgraded to 11ax/EHT) and 5G-NR due to hazardous conditions that make it difficult to place cables, placement near or on rotating or moving parts of a machine, and mobility requirements. As another example, amusement parks have some devices using 11ax/EHT (such as sensors, surveillance cameras) and also deploy 5G-NR coverage to cover the entire park. Similarly, railways and railcars may employ heterogeneous networks to ensure continuous coverage across the journey and control devices onboard. FIGS. 1A and 1B illustrate two example scenarios for how heterogeneous network deployment, but the disclosure herein may apply to any deployment of heterogeneous networks that involve traffic for an application across multiple RATs.

Further, some applications may have end-to-end requirements across multiple RATs. Some applications have stringent performance requirements. For example, deterministic periodic applications that send data periodically or deterministic aperiodic applications that send data aperiodically (e.g., safety critical information sent in response to a trigger) may have minimum performance requirements that must be guaranteed. Even non-deterministic applications may carry useful traffic and thus, include certain constraints, such as requirements based on latency, availability, mean-time-before-failure (MTBF), and service bit rate. Accordingly, several challenges may arise when attempting to maintain these traffic requirements across multiple RATs.

Applications with end-to-end latency/jitter, reliability and other requirements need to be supported in these networks. This is especially relevant as 802.11 systems, such as 802.11ax systems, are expected to be deployed in wide variety of scenarios, but may be limited in how they can support demanding applications. For example, such wireless systems may not have full-fledged access point (AP) controlled scheduled access for all times, e.g., they may use a mix of contention based (e.g., Carrier Sense Multiple Access with Collision Avoidance (CSMA/CA) or Enhanced distributed channel access (EDCA)) and scheduled access (with 11ax or EHT) and may have high overhead due to contention mechanisms. Further, exact periodic transmission may not be possible because of the lack of fixed boundaries for other ongoing transmissions and a lack of good support for pre-emption. Moreover, there is limited support for multi-AP coordination techniques and HARQ-like techniques in 802.11ax. Although development of new standards continues and may attempt to address these limitations, existing and legacy devices may still lack the capabilities to guarantee the support demanded by certain applications. Despite this, the Wi-Fi ecosystem remains attractive and wireless local area network (WLAN) devices will continue to be developed and deployed.

The next generation of mobile networks, e.g., 5G NR, is planned to have capabilities that exceed those of 802.11ax, EHT (11be) or Citizen Broadband Radio Service (CBRS)/LTE, including capabilities related to latency and reliability. However, particular methods and algorithms may be required to implement this new technology to make it work in standalone and in the heterogeneous scenarios considered herein. Accordingly, there are many challenges to meet low latency and high reliability requirements in the heterogeneous (also referred to as a hybrid) network considered herein.

Discussed herein are solutions addressing these technical problems in heterogeneous networks. Below are described several embodiments and examples relating to improved systems, apparatuses, and methods for communications in wireless networks including more than one RAT. Although the subject matter described herein may be implemented in any appropriate type of system using any suitable components, the embodiments disclosed herein are described in relation to certain configurations of wireless networks, such as the example wireless networks 100A and 100B illustrated in FIGS. 1A and 1B. For simplicity, FIG. 1A illustrates wireless network 100A with a first access point (AP) 110A serving an area 115A with a first RAT, a second AP 120A serving an area 125A with a second RAT, and a destination node 130A communicatively coupled to at least second AP 120A. Likewise FIG. 1B illustrates wireless network 100B with a first access point (AP) 110B serving an area 115B with a first RAT, a second AP 120B serving an area 125B with a second RAT, and a destination node 130B communicatively coupled to first AP 110B and second AP 120B. In practice, wireless networks 100A and 110B may further include any additional elements suitable to support communication between wireless devices or between a wireless device and another communication device, such as a landline telephone, a service provider, or any other network node or end device. Wireless networks 100A and 100B may provide communication and other types of services to one or more wireless devices to facilitate the wireless devices' access to and/or use of the services provided by, or via, the wireless network.

FIG. 1A illustrates wireless network 100A having at least two RATs served by first AP 110A and second AP 120A. Generally, first AP 110A provides wireless communications to area 115A using a first RAT. For example, one or more wireless devices (WDs) 111A may be located in area 115A and communicate wirelessly with first AP 110A. In the deployment scenario in FIG. 1A, communications may occur between WD 111A and destination node 130A using the first RAT through first AP 110A and second RAT provided by second AP 120A. For example, first AP 110A and second AP 120A may be configured to communicate with one another, e.g., using a common RAT. As a particular example, first AP 110A may be an z802.11ax or EHT access point that is communicatively coupled to or integrated with a 5G NR user equipment and second AP 120 is a 5G-NR access point (which may also be understood as including a base station). In certain embodiments, one or more WDs 121A may be located in area 125A and communicate wirelessly with second AP 120A. In this example, WD 111A may communicate with first AP 110A using Wi-Fi, first AP 110A may communicate with second AP 120A using 5G network resources through the 5G user equipment, and second AP 120A may communicate with destination node 130 using the 5G network (or any intermediary networks such as the internet, a wireline network, PTSN, etc.). This scenario may occur when there is an application at destination node 130A that uses WD 111A, but WD 111A is served by a first RAT that is different from destination node 130A or requires a different intermediary RAT to reach destination node 130A.

FIG. 1B illustrates wireless network 100B having at least two RATs served by first AP 110B and second AP 120B. FIG. 1B differs from FIG. 1A in that the application at destination node 130B requires communication with both WD 111B and WD 121B, which reside in areas not covered by the same RAT, e.g., the first RAT in area 115B and second RAT in area 125B. Alternatively, both WD 111B and WD 121B may be in areas that use the same RAT, but one of WD 111B and WD 121B is not scheduled resources on that RAT, is not able to connect to that RAT, or has a better connection through another RAT. As a particular example, WD 111B may be a sensor that signals to a controller application at destination node 130B through Wi-Fi with AP 110B (and any other intermediary networks, such as a wireline network). Based on the signals from the sensor, destination node 130B may send an operation signal to an actuator (as an example of WD 121B) using second AP 120B that uses a 5G NR network.

Wireless networks 100A and/or 100B may comprise and/or interface with any type of communication, telecommunication, data, cellular, and/or radio network or other similar type of system. In some embodiments, wireless networks 100A and/or 100B may be configured to operate according to specific standards or other types of predefined rules or procedures. Thus, particular embodiments of wireless networks 100A and/or 100B may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Wireless networks 100A and/or 100B may further include one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices. In certain embodiments, wireless networks 100A and/or 100B may comprise any number of wired or wireless networks, network nodes, base stations, controllers, wireless devices, relay stations, and/or any other components or systems that may facilitate or participate in the communication of data and/or signals whether via wired or wireless connections.

As used herein, destination nodes 130A and/or 130B refer to equipment capable, configured, arranged and/or operable to communicate directly or indirectly with a wireless device, wireless access point and/or with other network nodes or equipment in the wireless network to enable and/or provide wireless access to the wireless device and/or to perform other functions (e.g., administration) in the wireless network. For example, destination nodes 130A and/or 130B may include an access point (APs) (e.g., radio access points or WiFi APs), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. Yet further examples of destination nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. In certain embodiments, destination nodes 130A and/or 130B may be implemented in any suitable manner such that destination nodes 130A and/or 130B is configured to analyze input data, e.g., from a sensor WD 111B and send commands or instructions to another equipment, such as an actuator WD 121B.

As used herein, first APs 110A/B, second APs 120A/B, and/or WDs 111A/B, 121B may include any device capable, configured, arranged and/or operable to communicate wirelessly with network nodes and/or other wireless devices. In certain embodiments, first APs 110A/B, second APs 120A/B, and/or WDs 111A/B, 121B includes a user equipment (UE) configured to communicate on an LTE or 5G NR network or a wireless access point configured to communicate according to one or more wireless standards, such as WiFi. Communicating wirelessly may involve transmitting and/or receiving wireless signals using electromagnetic waves, radio waves, infrared waves, and/or other types of signals suitable for conveying information through air.

In some embodiments, first APs 110A/B, second APs 120A/B, and/or WDs 111A/B, 121B may be configured to transmit and/or receive information without direct human interaction. For instance, first APs 110A/B, second APs 120A/B, and/or WDs 111A/B, 121B may be designed to transmit information to a network on a predetermined schedule, when triggered by an internal or external event, or in response to requests from the network. Examples of first APs 110A/B, second APs 120A/B, and/or WDs 111A/B, 121B include, but are not limited to, a wireless access point, a wireless router, a wireless repeater, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc.

FIGS. 1A and 1B illustrate two examples of a multitude of configurations and implementations of wireless networks employing multiple RATs. As described above, those configurations may give rise to applications and uses that require transmissions using multiple RATs, some of which may be required to meet certain reliability requirements or data throughput. Although only certain configurations and implementations of a multi-RAT network are explicitly mentioned, the solutions described herein may apply equally to other multi-RAT networks and access points deployed therein.

Figure 2:
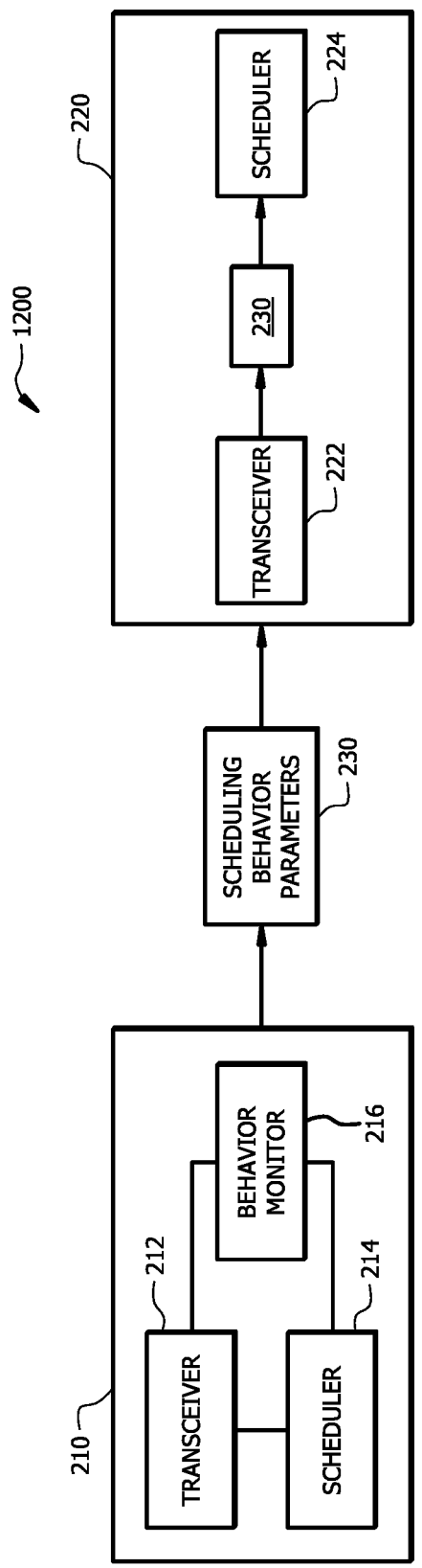
FIG. 2 illustrates example first and second wireless access points in a heterogeneous wireless network, in accordance with certain embodiments.

FIG. 2 illustrates an example of a first AP 210 and a second AP 220 in a heterogeneous wireless network 200, in accordance with certain embodiments. In certain embodiments, first AP 210 is one of first AP 110A and/or first AP 110B and second AP 220 is one of second AP 120A and/or second AP 120B. First AP 210 may include transceiver 212, scheduler 214 and behavior monitor 216. Transceiver 212 may be used to send and receive transmissions, including between first AP 210 and second AP 220 and between first AP 210 and a wireless client (not shown) such as WD 111A/B and/or between first AP 210 and a destination node, such as destination node 130A/B. Transceiver 212 may be configured to transmit wireless signals on at least a first RAT, such as Wi-Fi or a 5G network. In this manner, first AP 210 may be deployed in heterogeneous wireless network 200 and configured to serve traffic in the first RAT.

First AP 210 may use scheduler 214 to schedule resources on at least the first RAT for a client device. Scheduler 214 may follow any suitable methods or use any suitable techniques in scheduling traffic. In one example, scheduler 214 may schedule resources for traffic in the first RAT from a client device based on requested resources from the client device and other requests at the first AP 210. As discussed further below in reference to FIG. 3, there may be a mismatch between the requested resources and what is scheduled at scheduler 214. This mismatch may result in higher latency, lower reliability, etc. that may impact an application controlled at another node, such as destination node 130A/B.

Behavior monitor 216 may monitor scheduler 214, the traffic involving first AP 210, and/or requests for resources to determine how first AP 210 is operating with respect to multi-RAT traffic. For example, behavior monitor 216 may determine or calculate one or more parameters that characterizes the traffic, more particularly, how the traffic is scheduled, across first AP 210 as part of the multi-RAT transmission path including the second RAT of second AP 220. In this manner, behavior monitor 216 may obtain one or more performance characteristics of the traffic management and the traffic involving both first AP 210 and second AP 220. The traffic management characteristics may include any suitable parameter, value, or piece of information that indicates one or more scheduling or any other traffic management behavior. These value(s) and/or indication(s) may be transmitted to second AP 220, e.g., in Scheduling Behavior Indicators 230. In certain embodiments, Scheduling Behavior Indicators 230 may be communicated via a packet header or another portion of another signal or may be communicated as separate signaling. Particular embodiments and examples of Scheduling Behavior Indicators 230 are further provided below, and in particular, in reference to FIG. 3.

Similar to first AP 210, second AP 220 may include at least transceiver 222 and scheduler 224. Transceiver 222 may be configured to send and receive transmissions, including between first AP 210 and second AP 220 and between second AP 220 and a wireless client (not shown) such as WD 121B and/or between second AP 220 and a destination node, such as destination node 130A/B. Transceiver 222 may be configured to transmit wireless signals on at least a second RAT different from the first RAT of first AP 210, such as Wi-Fi or a 5G network. In this manner, second AP 210 may be deployed in heterogeneous wireless network 200 and configured to serve traffic in the second RAT.

Similarly, scheduler 224 is used by second AP 220 to schedule resources on at least the second RAT. Scheduler 224 may follow any suitable methods or use any suitable techniques in scheduling traffic. As an example, scheduler 224 may schedule resources for traffic in the second RAT involving a client device based on requested resources from the client device and other requests at the second AP 210. In certain embodiments, scheduler 224 also considers Scheduling Behavior Indicators 230 in scheduling resources. Scheduler 224 may account for any deficiencies or lack of resources at first AP 210 to ensure a required or preferred level of quality, reliability, and/or performance. As described further below, there are various ways that second AP 220 may incorporate and use Scheduling Behavior Indicators 230 in scheduling resources for multi-RAT communications.

Figure 3:
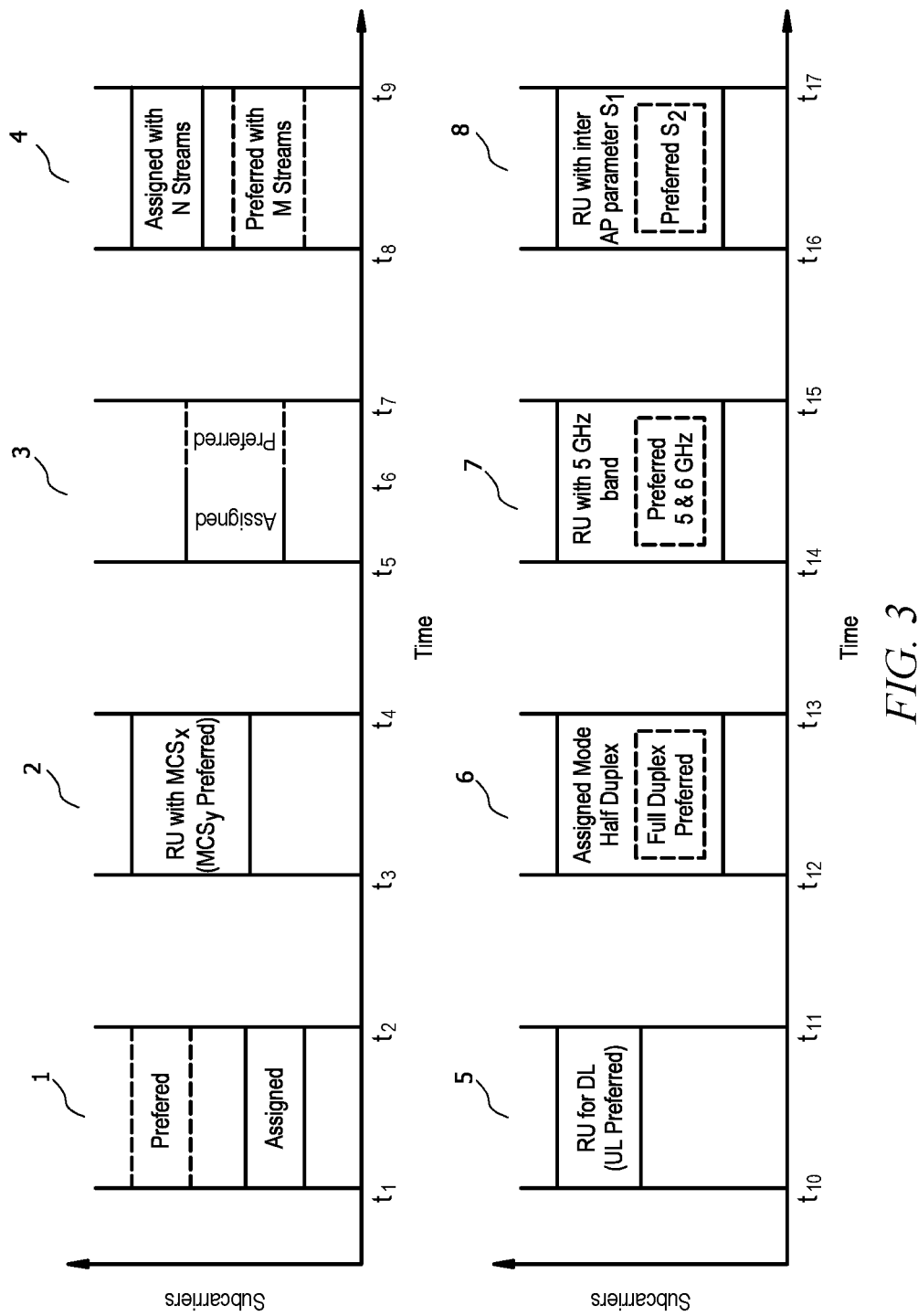
FIG. 3 illustrates example traffic request and allocation scenarios at a first wireless access point, in accordance with certain embodiments.

FIG. 3 illustrate example traffic request and allocation scenarios 1-8 at a wireless access point, such as first AP 410, in accordance with certain embodiments. As discussed above Scheduling Behavior Indicators 230 may be based on monitoring traffic at behavior monitor 216. This may be based on resources are requested or preferred and what is received or scheduled at scheduler 214. The eight scenarios in FIG. 3 illustrate example situations that may result in information that impacts the indicators sent to the other access point. In each scenario, there is a preferred resource and an observed resource. As described in further detail below, these two sets of measurements or values may be aggregated and processed to determine one or more indicators that may be included in Scheduling Behavior Indicators 230.

In scenario 1, between times t1 and t2, the client device preferred a resource in a first frequency band, but it was scheduled in a second frequency band.

In scenario 2, between t3 and t4, the client device is scheduled with a resource using a first modulation and coding scheme (MCS), MCSx, but it would have preferred a second MCS, MCSy.

In scenario 3, between t5 and t7, the client device preferred to be scheduled the entire time slice(s) between t5 and t7, but is only scheduled a resource for the time slice(s) between t5 and t6.

In scenario 4, between t8 and t9, the client device preferred a resource at a first frequency band with N spatial streams, but the client device is assigned a resource at a second frequency band with M spatial streams.

In scenario 5, between t10 and t11, the client device is assigned a resource for the downlink direction, even though it was preferred to be an uplink resource. Further, the channel width preferred by the client device may not have been the same as what was scheduled/assigned.

In scenario 6, between t12 and t13, the mode chosen for the client device is half-duplex, whereas full-duplex was preferred by the client device.

In scenario 7, between t14 and t15, the client device is assigned only the 5 GHz frequency band, but the client device prefers both the 5 GHz and 6 GHz bands.

In scenario 8, between t16 and t17, a different inter-AP coordination technique or parameter is set than what is preferred by the client device.

As shown in the various example scenarios, there can be a wide variety of mismatched resource assignments, which can impact the compliance with one or more reliability, performance, and/or quality requirements. Additionally, these mismatches may be used to indicate the scheduling performance/behavior of a first AP so that a second AP may schedule resources in a suitable manner to maintain compliance with those requirements.

Turning back to FIG. 2, behavior monitor 216 of first AP 210 may be configured to analyze the assignment and scheduling behavior for traffic involving multi-RAT transmissions involving second AP 220. Behavior monitor 216 may be further configured to compute one or more performance indicators related to latency, reliability and/or throughput, which may characterize the behavior of scheduling and reliability of first AP 210. Below are defined certain example performance reliability indicators that may be provided in Scheduling Behavior Indicators 230, either alone or together in a transmission.

According to a first example, a throughput, latency and reliability indicator (tlr_indicator) may be determined. In particular, the tlr_indicators may be derived for 11ax for client device u for time interval (t, t-e) for direction d (i.e. uplink or downlink) as resources get assigned in an 802.11ax network. Two indicators may be derived or calculated, one for the observed or assigned resources and another for the preferred resources:

$$tlr\_indicator\_obs[u;d;(t,t-e)] = \text{summation\_over}(k,r,m) \{lentimeslice[u;d,k,m,(t,t-e)] * drate[RU(u;d,k,m,r), MC\ S(u;d,k,m,r), ss(u;d,k,m,r)]\}$$

$$tlr\_indicator\_pref[u;d;(t,t-e)] = \text{summation\_over}(k,r,m) \{lentimeslice[u;d,k,m,(t,t-e)] * drate[RU(u;d,k,m,r), MC\ S(u;d,k,m,r), ss(u;d,k,m,r)]\}$$

Here, tlr_indicator_obs is computed accounting for resources assigned (by AP) and tlr_indicator_pref is computed accounting for resources preferred by client device (or the application running on the client device). lentimeslice [u;d,k,m,(t,t-e)]) is defined as the length of time slice k when user u is served during (t,t-e) for direction d (DL or UL) in mode m (half-duplex, full-duplex). RU(u;d,k,m,r) is defined as the resource unit (RU) r assigned to user u for time slice k in direction d (i.e. DL or UL) for mode m. MCS(u;d,k,m,r) is the MCS assigned to user u in RU r for time-slice k in direction d for mode m. ss(u;d,k,m,r) are the spatial streams (for spatial multiplexing) assigned to user u in RU r for time slice k in direction d for mode m. drate[RU, MCS, ss] is the data rate as a function of assigned RU in a given time slice, MCS and spatial streams ss in the direction d. Direction d is either downlink (DL) or uplink (UL). Mode m is either HD (half-duplex) or FD (full-duplex).

Behavior monitor 216 may monitor each of these values both for what is preferred by the client device and what is actually assigned, e.g., by scheduler 214. Accordingly, each of tlr_indicator_obs and tlr_indicator_pref may be computed and sent to second AP 220, e.g., in Scheduling Behavior Indicators 230. In certain embodiments, both tlr_indicator_obs and tlr_indicator_pref are included in Scheduling Behavior Indicators 230. In certain embodiments, only one of tlr_indicator_obs and tlr_indicator_pref are included in Scheduling Behavior Indicators 230. In certain embodiments, neither tlr_indicator_obs nor tlr_indicator_pref are Scheduling Behavior Indicators 230, but an indicator based on one or both of tlr_indicator_obs and tlr_indicator_pref is included in Scheduling Behavior Indicators 230.

According to a second example, a performance indicator (r_indicator) may be determined. In particular, another example indicator for the first RAT, e.g., an 802.11ax network. A FIRST performance indicator may be derived from observed parameters, for device u over time interval (t,t-e) for direction d (DL, UL):

$r\_indicator\_obs[u;d,(t,t-e)]=$function$\{per[u;d,(t,t-e)],$
$num\_consecutive\_pkt\_losses[u;d,p,(t,t-e)],$
$num\_pkts\_above\_delayjitter[u;d,(t,t-e)],num\_$
$consecutive\_pkts\_delayed[ui;d,(t,t-e)]\}$ A second performance indicator may be derived from preferred parameters, for device u over time interval (t,t-e) for direction d (DL, UL):

$r\_indicator\_pref[u;d,(t,t-e)]=$function$\{per[u;d,(t,t-e)],$
$num\_consecutive\_pkt\_losses[u;d,p,(t,t-e)],$
$num\_pkts\_above\_delayjitter[u;d,(t,t-e)],num\_$
$consecutive\_pkts\_delayed[ui;d,(t,t-e)]\}$ Here, per[u;d,(t,t-e)] is the packet error rate for user u in direction d (i.e. UL or DL) during the interval (t,t-e). The num_consecutive_pkt_losses[u;d,p,(t,t-e)] is the number of p (or more) consecutive packet losses for user u in direction d during the interval (t,t-e). The num_pkts_above_delayjitter [u;d,(t,t-e)] is the number of packets with delay or jitter above a target value for the first RAT network (e.g., the 802.11 network). For user u in direction d during (t, t-e), num_consecutive_pkts_delayed[u;d,p1,(t,t-e)] is the number of times that p1 (or more) consecutive packets are delayed above their latency/jitter targets for user u in direction d during the interval (t,t-e).

In this manner, a pair of reliability indicators may be defined for scheduling at the first AP 220. In particular, in certain embodiments, behavior monitor 216 may monitor each constituent values for both preferred by the client and observed as assigned, e.g., by scheduler 214. Accordingly, each of r_indicator_obs and r_indicator_pref may be computed and sent to second AP 220, e.g., in Scheduling Behavior Indicators 230. In certain embodiments, both r_indicator_obs and r_indicator_pref are included in Scheduling Behavior Indicators 230. In certain embodiments, only one of r_indicator_obs and r_indicator_pref are included in Scheduling Behavior Indicators 230. In certain embodiments, neither r_indicator_obs and r_indicator_pref are Scheduling Behavior Indicators 230, but an indicator based on one or both of r_indicator_obs and r_indicator_pref is included in Scheduling Behavior Indicators 230.

According to a third example, delta indicators (delta_tlr_indicator and delta_r_indicator) may be determined. In particular, the following "delta" indicators may be defined, for user u during time interval (t, t-e) in the direction d (DL, UL):

delta_*tlr*_indicator=*tlr*_indicator_pref minus*tlr*_indicator_*obs* if*tlr*_indicator_*obs*<*tlr*_indicator_pref (and1,otherwise);

delta_*r*_indicator=*r*_indicator_pref minus*r*_indicator_*obs* if*r*_indicator_*obs*<*r*_indicator_pref (and 1,otherwise)

In this manner, instead of using two separate indicators, each of the preferred and observed indicators may be convoluted into a single delta indicator for each of the example indicators discussed above. For example, the delta indicators may measure a level of deviation from the preferred resources, which may trigger second AP 220 to react, e.g., by scheduling more resources, if the delta indicator is above or below a predefined threshold.

As discussed above, the indicators, such as those provided above, may be provided in Behavior Scheduling Indicators 230 that is transmitted to second AP 220. Second AP 220 may be configured to efficiently schedule resources using the indicators provided about the scheduling and reliability of first AP 210 serving a client using the first and second RATs. There are a variety of ways second AP 220 may use these indicators as demonstrated by the variety of examples below. The examples below are divided into two sections (1) Efficient UL Scheduling and Reliability and (2) Efficient DL Scheduling and Reliability.

Particular embodiments include efficient uplink (UL) scheduling and reliability. In certain embodiments, as the number of users (and/or traffic load) increases in the second RAT network, an event based shaping mechanism is triggered which causes client devices to stop participating in the contention based access and second AP 220 runs the second RAT network in scheduled access mode as long as event based shaping is active. Some second RAT networks such as 5G-NR support scheduled access directly and this initial step may not be necessary when the second RAT is 5G-NR, but may be useful if the second RAT is an 802.11 network.

In certain embodiments, the uplink resources scheduled by second AP 220 are either UL PRBs (Physical Resource Blocks) in according to the 3GPP standard or RUs in an 802.11ax network. 3GPP standard systems are required to reserve PRBs for UL communication, which becomes difficult for the aperiodic scenarios considered for the heterogeneous network environment described herein. For an AP in 11ax mode, the AP may schedule some RUs for DL or UL communication and reserves certain RUs that client devices can access using an flax specific random access mechanism for UL communication. In normal 11ax operation, the availability of suitable UL random access and scheduled RUs have a big impact on UL performance (especially for aperiodic traffic), but an flax AP cannot assign too many for at least the reason that it does not know what is needed for UL operation in such aperiodic cases and could result in loss of resources if these RUs are not used properly.

In certain embodiments, second AP 220 uses performance indicators from Scheduling Behavior Indicators 230 (such as tlr_indicator, r_indicator, or other parameters characterizing the behavior of the UL from first AP 210) to estimate number of uplink PRBs or RUs that second AP 220 should assign at any given moment in the second RAT network for UL random and scheduled access.

In certain embodiments, second AP 220 uses these indicators to estimate channel width of these PRBs or RUs. These measurements may improve reliability (in addition to latency) because the second AP 220 may send UL data via multiple and suitable size PRBs or RUs in the second RAT network to improve its reliability and latency. This may be especially advantageous if data for that user was not experiencing good performance in the first RAT network indicated by performance indicators computed above.

In certain embodiments, the second RAT is a 11ax or EHT network. In some embodiments, the number of UL RUs are allocated in proportion to delta_r_indicator (or similar delta reliability indicator) considering all users who are sending UL data from the first RAT to the second RAT. In some embodiments, the delta_tlr_indicator and/or delta_r_indicator (or similar delta indicators) are used to determine width of the UL RUs. In some embodiments, higher weight is given to delta_tlr_indicator when determining the width of the UL RUs. In this manner, the indicators may be used to determine uplink resources for multi-RAT transmissions on the second RAT.

In certain embodiments, a fraction of these RUs are allocated to specific users and/or clients for scheduled access and other RUs are allocated for random access for UL transmission. In some embodiments, this fraction is also based, at least partially, using values of the performance indicators, e.g., the example indicators described above. If the second RAT is an EHT network, performance indicators for 5 GHz as well as 6 GHz band can be used as a collective pool (though with EHT specific characteristics) while doing resource allocation in these bands.

In certain embodiments, the second RAT is a 5G-NR (or LTE) network. In this set of embodiments, 3GPP PRBs may be considered instead of 11ax RUs. In certain embodiments, the methods for allocating the RUs as described above may be applied to PRBs, e.g., allocating the number of UL PRBs, the width of the UL PRBs, and the fraction of PRBs allocated for scheduled and random access. Additionally, in certain embodiments, the traffic indicators may be used to determine one or more other UL parameters such as UL PRBs, slot-lengths, frame structure and level of spatial diversity for aperiodic UL communication in the second RAT. For example, a higher number of UL mini-slots in the second RAT network are allocated as the UL tlr_indicator for the first RAT network increases. In this manner, end-to-end performance constraints may be met even if the first RAT is not performing well.

5G-NR defines Bandwidth Parts that indicate the bandwidth over which a device is ready to receive transmission of a given numerology. In 3GPP Release-15, a device is limited to using only one active Bandwidth Part at a time, however, this constraint may be relaxed in later releases. Accordingly, the access point and device may prefer to figure out which numerologies to use at a given point of time. For example, for subcarrier spacing 15/30/60 KHz, the max channel bandwidth may be 50/100/200 MHz and slot length may be 1/0.5/0.25 ms. In certain embodiments, second AP 220 uses UL performance indicators (such as tlr_indicator and r_indicator for reliability, latency and throughput) communicated via first AP 210 and uses these along with other second RAT related parameters to compute UL Bandwidth Parts for the client device. The client device may be a 5G user equipment of the second RAT network that interfaces with the first RAT via first AP 210 for sending UL data from the first RAT to the second RAT.

In 5G-NR, a UE monitors the PDCCH (physical downlink control channel) in a slot to look for an UL or DL scheduling grant from the access point, such as second AP 220. 5G-NR also allows the configuration of the UE to monitor several PDCCHs to support traffic with low latency. But, second AP 220 in the second RAT would preferably decide the number of these PDCCHs. In certain embodiments, the UL performance indicators obtained from first AP 210 via Scheduling Behavior Indicators 230 are used by second AP 220 to dynamically configure (and change) PDCCHs per-slot, e.g., for a 5G-NR UE that is interfacing with first AP 210 and used to communicate UL data with the second RAT via second AP 220, e.g., a 5G network.

According to certain embodiments, for dual mode of the first RAT and the second RAT (e.g., a 11ax/EHT network and a 5G-NR network), dual connectivity is supported. Accordingly, the first RAT and the second RAT networks may dynamically decide split of traffic across the two RATs. In certain embodiments, the first AP 210 and/or the second AP 220 may decide this split using UL performance indicators, such as those described above. For example, UL traffic may be chosen to be sent via 5G-NR (the second RAT in this example) network in proportion to UL performance indicators for the RAT (e.g., r_indicator and/or tlr_indicator). In some embodiments, the number of UL packets to be duplicated across these networks may be estimated using the UL performance indicators computed earlier to improve reliability of our system.

In this manner, there traffic or behavior indicators disclosed herein may be used for scheduling resources on the second RAT more efficiently.

Particular embodiments include efficient downlink scheduling and reliability. Similar to the previous section, the traffic indicators described herein may be used by second AP 220 to determine the scheduling of resources on the second RAT. According to certain embodiments, the first RAT DL performance indicators (such as delta_tlr_indicator, delta_r_indicator and other parameters as described above, but for DL) are received at the second RAT, e.g., second AP 220 via Scheduling Behavior Indicators 230, and used to schedule resources for those users on second RAT resources.

In certain embodiments, additional weight (i.e. above what a normal DL scheduling and reliability module would decide for the second RAT) for the number of DL RUs (or PRBs) in proportion to delta_r_indicator (e.g., in relation to all users who are sending DL data from the first RAT to the second RAT. In certain embodiments, traffic indicators such as delta_tlr_indicator and delta_r_indicator (e.g., with higher weight given to delta_tlr_indicator in some embodiments) are used, at least partially, to determine the width of the DL RUs that are used for DL traffic. In some embodiments where EHT is the second RAT, 5 GHz and 6 GHz bands are treated as a collective pool and the obtained performance indicators are used as described herein to allocate resources in these bands.

In certain embodiments, the second RAT is a 5G-NR network (or LTE network). In some embodiments, one or more of the performance indicators is used to decide certain DL parameters such as DL PRBs, slot-lengths, frame structure and level of spatial diversity (in that time slice) for aperiodic DL communication in the second RAT. For example, a higher number of DL mini-slots are allocated in the second RAT network as the DL tlr_indicator for the first RAT network increases. In this manner, certain end-to-end performance constraints may be met even if the first RAT is not performing that well.

Some embodiments include an interface between the first RAT and the second RAT, e.g., between first AP 210 and second AP 220. In some embodiments, the interface is used to provide inter-AP coordination between the first RAT and the second RAT based on the traffic indicators described herein. For example, enhanced inter-AP coordination methods, such as CoMP (coordinated multipoint processing), may be triggered for inter-AP and inter-RAT scenarios between the first RAT and the second RAT AP for a dual mode client that supports both RATs based on the traffic indicator, e.g., exceeding or dropping below a predetermined threshold or level. In addition to the previously described advantages, these techniques may improve reliability for where the first RAT client (e.g., in an 802.11ax network) does not have good access to reliability methods/techniques in the first RAT network (e.g., the first RAT network is not configured with HARQ and/or lacks additional 11ax RUs for high reliability). In this manner, the traffic indicators may be used to leverage the features of the second RAT (e.g., a 5G-NR network) along with the first RAT to improve performance. In some embodiments DL traffic indicators may be used to trigger such inter-AP inter-RAT coordination mechanisms.

As discussed above, 5G-NR defines Bandwidth Parts indicating the bandwidth over which a device is ready to receive transmission of a given numerology. In certain embodiments, the second RAT, e.g., using second AP 220, uses DL traffic indicators (such as tlr_indicator and r_indicator for reliability, latency and throughput) communicated via first AP to determine the DL Bandwidth Parts for the client device. The client device may be a UE that interfaces with first AP 210 for sending DL data from the second RAT to the first RAT.

As indicated previously, a 5G-NR UE monitors PDCCH (physical downlink control channel) in a slot to look for an UL or DL scheduling grant from an access point, such as a base station. 5G-NR networks may configure the UE to monitor several PDCCHs to support traffic with low latency. But, a second AP in the second RAT may decide the number of these PDCCHs. According to certain embodiments, DL traffic indicators, e.g., those obtained via Scheduling Behavior Indicators 230 obtained from first AP 210 (along with other second RAT parameters) are used to dynamically configure (and change) PDCCHs per-slot for the 5G-NR UE that is interfacing with first AP 210 and used to forward DL data from the second RAT to the first RAT.

In certain embodiments, a wireless device operates in a dual mode with the first RAT and the second RAT (e.g., 11ax/EHT and 5G-NR). In some embodiments, the traffic across the first RAT and the second RAT is dynamically split using the DL traffic indicators, such as those described above. For example, DL traffic may be chosen to be sent via 5G-NR (the second RAT) network in proportion to DL performance indicators for the first RAT (such as r_indicator, and/or tlr_indicator) determined at first AP 210. In some embodiments, the number of DL packets to be duplicated across these networks may be estimated or computed using at least the DL traffic indicators to improve reliability.

In certain embodiments in which the first RAT is an 802.11ax network, first AP 210 may not work in scheduled mode in all the time slices and may work in non-scheduled mode (such as with 11n or 11ac) in some time slices. In those time slices, a device may get full channel bandwidth and it is also possible that only one device may be served in that time slice (e.g. in the absence of DL MU-MIMO with 802.11ac). Such time slices may be considered in the determination of the indicators as if the RU width is full channel bandwidth in that time slice.

In certain embodiments, in which the first RAT is an EHT network, both 5 GHz and 6 GHz bands are considered while analyzing and computing the performance indicators that are included in Behavior Scheduling Indicators 230. In some embodiments only one of 5 GHz and 6 GHz bands are considered.

In certain embodiments, where the first RAT is a CBRS network, LTE physical resource blocks are used instead of 802.11ax resource units for analysis and computation of the indicators at first AP 210.

In certain embodiments, any suitable information (including various parameters and indicators discussed above), network parameters, and machine learning methods (e.g., Support Vector Machines (SVMs), Support Vector Regression (SVR), or Reinforcement Learning (RL)) may be used to characterize behavior of the scheduling and reliability of first AP 210.

Figure 4:
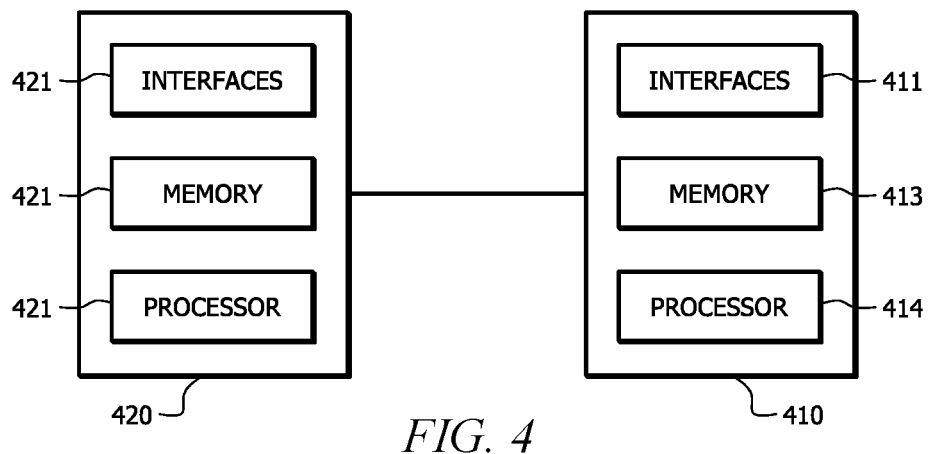
FIG. 4 illustrates configurations of first and second wireless access point, in accordance with certain embodiments.

FIG. 4 illustrates configurations of a first access point 410 and a second access point 420, in accordance with certain embodiments. First AP 410 includes one or more interfaces 411, a memory 412 and a processor 413. First AP 410 may include multiple sets of one or more of the illustrated components for different wireless technologies supported by first AP 410, such as, for example, GSM, WCDMA, LTE, NR, WiFi, WiMAX, or Bluetooth wireless technologies, just to mention a few. Likewise, second AP 420 includes one or more interfaces 421, a memory 422 and a processor 423. Second AP 420 may include multiple sets of one or more of the illustrated components for different wireless technologies supported by second AP 420, such as, for example, GSM, WCDMA, LTE, NR, WiFi, WiMAX, or Bluetooth wireless technologies, just to mention a few. These wireless technologies may be integrated into the same or different chips or set of chips as other components within first AP 410 and/or second AP 420.

Interfaces 411 and/or 421 may include one or more antennas or antenna arrays, configured to send and/or receive wireless signals. In certain alternative embodiments, interfaces 411 and/or 421 may not include an antenna, but may include an interface for interfacing with an external antenna connectable to first AP 410 and/or second AP 420 through one of interfaces 411 and/or 421. Interfaces 411 and/or 421 and/or processor 413 and/or 423 may be configured to perform any receiving or transmitting operations described herein as being performed by first AP 410 and/or second AP 420, respectively. Any information, data and/or signals may be received from a network node and/or another wireless node.

In certain embodiments, interfaces 411 and/or 421 includes one or more of radio front end circuitry and an antenna. For example, interfaces 411 and/or 421 may include one or more filters or amplifiers that is connected to transmission components. In some embodiments, interfaces 411 and/or 421 are configured to or receive analog or digital data that is sent out to other nodes or terminal devices via a wireless connection. In some embodiments, interfaces 411 and/or 421 may include circuitry configured to convert data from digital to analog and vice versa. Signals and data received may be passed to processor 413 and/or processor 423, respectively. Accordingly, interfaces 411 and/or 421 may include any suitable interfacing components for receiving and/or transmitting wireless communications.

In certain embodiments, interfaces 411 and/or 421 may also include one or more interfaces for communicating between different components of first AP 210 or second AP 220, including any components described in FIG. 2 of first AP 210, such as transceiver 212, scheduler 214, and behavior monitor 216 or of second AP 220, such as transceiver 222 and scheduler 224.

Processor 413 and/or 423 may include be any electronic circuitry, including, but not limited to microprocessors, application specific integrated circuits (ASIC), application specific instruction set processor (ASIP), and/or state machines, that communicatively couples to memory 412 and 422, respectively, and controls the operation of first AP 410 and second AP 420, respectively. Processor 413 and/or 423 may be 8-bit, 16-bit, 32-bit, 64-bit or of any other suitable architecture. Processor 413 and/or 423 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 413 and/or 423 may include other hardware and software that operates to control and process information. Processor 413 and/or 423 executes software stored on memory 412 and 422, respectively, to perform any of the functions described herein. For example, processor 413 may control the operation and administration of first AP 420 by processing information received from memory 412, or any external databases, or any other components of the wireless network in which it is deployed. In certain embodiments, processor 413 and/or 423 may be configured to carry out one or more functions of first AP 210 and second AP 220, respectively, or any components thereof, such as transceiver 212, scheduler 214, behavior monitor 216, transceiver 222 and/or scheduler 224.

Processor 413 and/or 423 may be a programmable logic device, a microcontroller, a microprocessor, any suitable processing device, or any suitable combination of the preceding. Processor 413 and/or 423 is not limited to a single processing device and may encompass multiple processing devices. In certain embodiments, processor 413 and/or 423 includes one or more of wireless transceiver circuitry, wireless signal processing circuitry, and application processing circuitry. In other embodiments, the processor 413 and/or 423 may include different components and/or different combinations of components. In certain embodiments processor 405 includes a system on a chip. In some embodiments, processor 413 and/or 423 or components thereof may be on a single chip, separate chips, or a set of chips.

Memory 412 and/or 422 may store, either permanently or temporarily, data, operational software, or other information for processor 415. In certain embodiments, memory 412 and/or 422 may store one or more indicators of scheduling behavior, such as Scheduling Behavior Indicators 230 or any other information used in scheduling resources for multi-RAT transmissions using first AP 210 and second AP 220. Memory 412 and/or 422 may include any one or a combination of volatile or non-volatile local or remote devices suitable for storing information. For example, memory 412 and/or 422 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 410, a disk, a CD, or a flash drive. Memory 412 and/or 422 may be operable to store a computer program, software, an application including one or more of logic, rules, code, tables, etc. and/or other instructions capable of being executed by processor 413 and/or 423. In particular embodiments, the software may include an application executable by processor 413 and/or 423 to perform one or more of the functions described herein. In certain embodiments, memory 412 and/or 422 may be or implemented as a NoSQL database. In some embodiments, processor 413 and/or 423 and memory 412 and/or 422 may be considered to be integrated.

In certain embodiments, some or all of the functionality described herein as being performed by first AP 410 and/or second AP 420 (and first AP 210 and/or second AP 220) may be provided by processor 413 and/or 423, respectively, executing instructions stored on memory 412 and/or 422, respectively, which in certain embodiments may be a computer-readable storage medium. In alternative embodiments, some or all of the functionality may be provided by processor 413 and/or 423 without executing instructions stored on a separate or discrete device readable storage medium, such as in a hard-wired manner. In any of those particular embodiments, whether executing instructions stored on a device readable storage medium or not, processor 415 can be configured to perform the described functionality.

Processor 413 and/or 423 may be configured to perform any determining, calculating, or similar operations (e.g., certain obtaining operations) described herein as being performed by first AP 410 and second AP 420. These operations, as performed by processor 413 and/or 423, may include processing information obtained by processor 413 and/or 423 by, for example, converting the obtained information into other information, comparing the obtained information or converted information to information stored by first AP 410 and second AP 420, and/or performing one or more operations based on the obtained information or converted information, and as a result of said processing making a determination.

In particular embodiments, one or more functions described herein relating to first AP 110, first AP 210, and/or first AP 410 may be implemented using one or more interfaces 411, memory 412, and processor 413, their equivalents, or any suitable combination of hardware and software as understood by persons having skill in the art capable of carrying out one or more functions or methods described herein. Likewise, in particular embodiments, one or more functions described herein relating to second AP 110, second AP 210, and/or second AP 410 may be implemented using one or more interfaces 421, memory 422, and processor 423, their equivalents, or any suitable combination of hardware and software as understood by persons having skill in the art capable of carrying out one or more functions or methods described herein.

Figure 5:
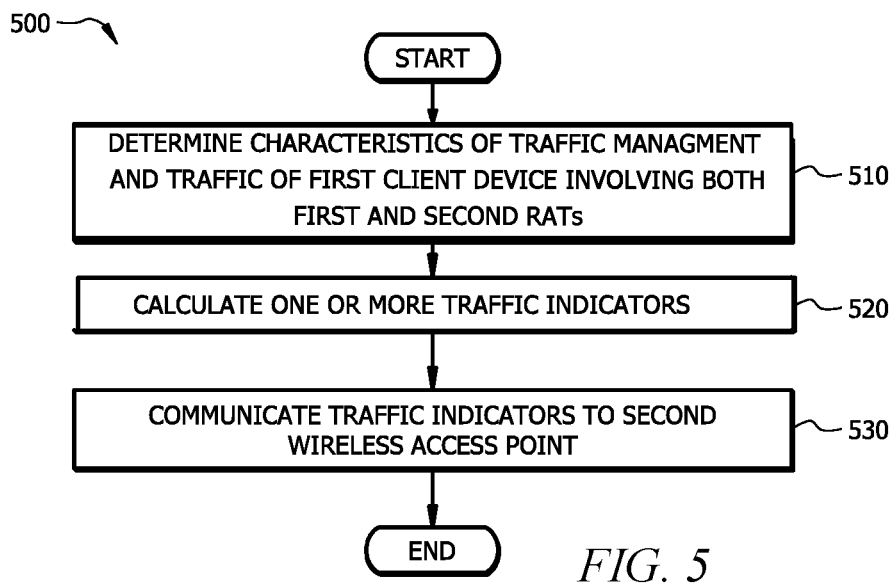
FIG. 5 is a flowchart diagram of a first example method in a wireless access point, in accordance with certain embodiments.

FIG. 5 is a flowchart diagram of a first example method 500 in a wireless access point, in accordance with certain embodiments. Method 500 may begin at step 510. At step 510, one or more performance characteristics of traffic management and traffic of a first client device are determined. The traffic management for which the characteristics are determined involve both a first wireless access point, such as first AP 210 and/or first AP 410 using a first RAT and a second wireless access point, such as second AP 220 and/or second AP 420, using a second RAT. For example, the scheduling and reliability behaviors at the access point may be monitored based on the resources preferred or requested by a client device and those resources that are actually scheduled. The behaviors monitored may also include whether a certain number of packets have been dropped or other reliability characteristics as described in the sections above. For example, behavior monitor 216 may monitor the scheduling and reliability behavior of first AP 210, including monitoring the scheduling at scheduler 214.

At step 520, one or more traffic indicators are calculated based on the performance characteristics of the traffic management modules and traffic of the first client device. For example, first AP 210 may determine one or more indicators based on behaviors monitored by behavior monitor 216 compiled over a certain period of time. In certain embodiments, the traffic indicators may be one or more the tlr_indicators, the r_indicator, the delta_tlr_indicator, and/or the delta_r_indicator for one or more of DL and UL resources. The indicator(s) may be computed at first AP 21—and used by second AP 220 for scheduling decisions, as described herein.

At step 530, at least one of the one or more traffic indicators are communicated to a second wireless access point. The communicated traffic indicators are configured to be used by the second wireless access point to schedule resources using the second RAT. For example, one or more of the traffic indicators may be transmitted to second AP 220 via Scheduling Behavior Indicators 230. This may be in the form of a separate inter-AP message or signal or may be part of an existing or scheduled transmission having an additional purpose. For example, one or more indicators may be indicated to second AP using one or more header portions of a signal. In this manner, the indicators regarding the scheduling and reliability at the access point may be transmitted to another access point for use in scheduling resources on the second RAT for a client device's multi-RAT traffic.

Modifications, additions, or omissions may be made to method 500 depicted in FIG. 5. Method 500 may include more, fewer, or other steps. Additionally, steps may be performed in parallel or in any suitable order. While discussed as first AP 210 and/or first AP 410 as performing certain steps, any suitable component of first AP 210 and/or first AP 410 may perform one or more steps of the methods. Additionally, method 500 may include any suitable step to carry out any of the described functions of first AP 210 and/or first AP 410. Further, any of steps of method 500 may computerized and/or carried out using hardware, such as processor 413 of first AP 410, or any other suitable system implementing one or more components of first AP 210 and/or first AP 410, such as any hardware or software implementing transceiver 212, scheduler 214, or behavior monitor 216.

Figure 6:
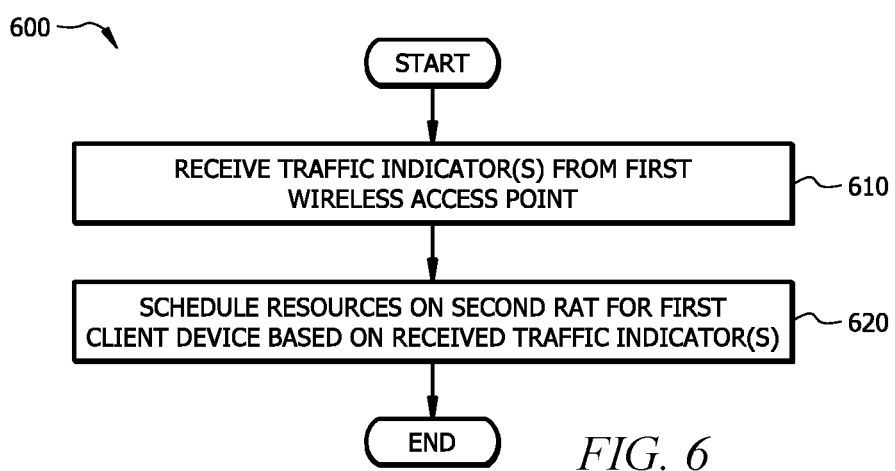
FIG. 6 is a flowchart diagram of a second example method in a wireless access point, in accordance with certain embodiments.

FIG. 6 is a flowchart diagram of a second example method 600 in a wireless access point, in accordance with certain embodiments. Method 600 may begin at step 610. At step 610, at least one traffic indicator is received from a first wireless access point, such as first AP 210 and/or first AP 410. Thus at least one traffic indicator is based on performance characteristics of the traffic management and traffic of a first client device involving the first wireless access point using a first RAT and a second wireless access point using a second RAT, such as second AP 220 and/or second AP 420. In certain embodiments, the at least one traffic indicator includes one or more of a tlr_indicator, an r_indicator, a delta_tlr_indicator, and a delta_r_indicator for one or more of DL and UL. In certain embodiments, the indicators are transmitted in a separate signal between the access point and the first access point. In other embodiments, the indicators are contained in a signal with one or more additional purposes, e.g., as header bits of an existing or scheduled signal.

In certain embodiments, the AP is configured to extract one or more of the performance characteristics of the traffic management and the traffic of the first client between the first client device and the other wireless access point using the at least one traffic indicator. For example, the indicators may be associated with one or more parameters describing the traffic at the first access point, but must be processed to obtain said parameters. In this manner, the access point may obtain information usable to adjust the scheduling of resources.

At step 620, resources for the first client device using the second RAT are scheduled based at least on the at least one traffic indicator. Scheduling resources in the second RAT may include one or more substeps. In certain embodiments, scheduling resources in the second RAT include one or more of the techniques described with respect to efficient uplink and downlink scheduling and reliability. For example scheduling downlink resources may include one or more of:

estimating a number of downlink resource units or physical resource blocks to assign to the first client device in on the second RAT for random and scheduled access;

estimating a channel width for downlink resources to assign to the first client device;

estimating one or more parameters of downlink resource units or physical resource blocks assigned to the first client device;

calculating one or more bandwidth parts for the first client device for sending downlink data between the first RAT and the second RAT;

configuring a number of physical downlink control channels per slot; and if the wireless device is a dual-mode user equipment, determining a split of downlink traffic across the first RAT and the second RAT.

Accordingly, step 620 may involve one or more substeps, which may depend on the indicator or indicators received in step 610 and/or type of RAT of the second RAT.

Modifications, additions, or omissions may be made to method 600 depicted in FIG. 6. Method 600 may include more, fewer, or other steps. Additionally, steps may be performed in parallel or in any suitable order. While discussed as second AP 220 and/or second AP 420 as performing certain steps, any suitable component of second AP 220 and/or second AP 420 may perform one or more steps of the methods. Additionally, method 600 may include any suitable step to carry out any of the described functions of second AP 220 and/or second AP 420. Further, any of steps of method 600 may computerized and/or carried out using hardware, such as processor 423 of second AP 420, or any other suitable system implementing one or more components of second AP 220 and/or second AP 420, such as any hardware or software implementing transceiver 222 or scheduler 224.

Although wireless nodes are described herein with reference to their use in particular wireless environments, e.g., wireless networks using the WiFi standard or radio networks such as an LTE or 5G NR network, the techniques and technical improvements thereof are also applicable to any suitable multi-radio access technology environment or network, such as those including a CBRS network.

In addition, techniques, systems, subsystems, and methods described and illustrated in the various embodiments as discrete or separate may be combined or integrated with other systems, modules, techniques, or methods without departing from the scope of the present disclosure. Other items shown or described as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

The invention claimed is:

1. A first wireless access point using a first radio access technology (RAT) in a heterogeneous wireless network including the first wireless access point and a second wireless access point using a second RAT, the first wireless access point comprising:
   one or more interfaces configured to receive wireless transmissions;
   a memory comprising instructions; and
   a hardware processor;
   wherein the first wireless access point, when executing the instructions at the hardware processor, is configured to:
   determine one or more performance characteristic for traffic management and traffic between a first client device and the first wireless access point using the first RAT and the second wireless access point using the second RAT, wherein the one or more performance characteristic comprises one or more characteristics of radio resources assigned to the first client device and one or more characteristics of radio resources preferred by the first client device;
   calculate one or more traffic indicators based on the traffic management and the traffic of the first client device; and
   communicate at least one of the one or more traffic indicators to the second wireless access point, wherein the at least one of the one or more communicated traffic indicators are for use by the second wireless access point to schedule radio resources of the second RAT,
   wherein the one or more characteristics of radio resources assigned and one or more characteristics of radio resources preferred comprise one or more of a subcarrier, a length of slice time, a modulation and coding scheme, a number of physical streams, a resource direction, a mode, a frequency band, and an inter-access point coordination parameter.

2. The first wireless access point of claim 1, wherein calculating the one or more traffic indicators comprises comparing the one or more characteristics of radio resources assigned to the first client device and the one or more characteristics of radio resources preferred by the first client device.

3. The first wireless access point of claim 1, wherein the one or more traffic indicators comprises a throughput, latency, and reliability (TLR) indicator, wherein the TLR indicator is calculated based on a data rate of the traffic of the first client device multiplied by a length of a time slice associated with the data rate.

4. The first wireless access point of claim 1, wherein the one or more traffic indicators comprises a reliability indicator, wherein the reliability indicator is based on one or more of a packet error rate, a number of consecutive packet losses, a number of packets with delay or jitter above a predetermined target value, and a number of incidents of a number (n) consecutive packets with delay or jitter above a predetermined target value.

5. The first wireless access point of claim 1, wherein the one or more traffic indicators comprises at least two traffic indicators, the at least two traffic indicators comprising a first traffic indicator associated with assigned radio resources for the first client device and a second traffic indicator associated with preferred assignment of radio resources by the first client device.

6. The first wireless access point of claim 5, wherein the one or more traffic indicators comprises at least three traffic indicators, the at least three traffic indicators comprising a third traffic indicator based on a difference between values of the first traffic indicator and values of the second traffic indicator.

7. The first wireless access point of claim 1, wherein the first RAT is a Wi-Fi RAT and the second RAT is a 5G-NR RAT.

8. A method in a first wireless access point using a first radio access technology (RAT) in a heterogeneous wireless network including the first wireless access point and a second wireless access point using a second RAT, the method comprising:
   determining one or more performance characteristics of traffic between a first client device and the first wireless access point using the first RAT and the second wireless access point using the second RAT, wherein the one or more performance characteristic comprises one or more characteristics of radio resources assigned to the first client device and one or more characteristics of radio resources preferred by the first client device;
   calculating one or more traffic indicators based on the one or more performance characteristics of the traffic of the first client device; and
   communicating at least one of the one or more traffic indicators to the second wireless access point, wherein the at least one of the one or more communicated traffic indicators are for use by the second wireless access point to schedule radio resources of the second RAT,
   wherein the one or more characteristics of radio resources assigned and one or more characteristics of radio resources preferred comprise one or more of a subcarrier, a length of slice time, a modulation and coding scheme, a number of physical streams, a resource direction, a mode, a frequency band, and an inter-access point coordination parameter.

9. The method of claim 8, wherein calculating the one or more traffic indicators comprises comparing the one or more characteristics of radio resources assigned to the first client device and the one or more characteristics of radio resources preferred by the first client device.

10. The method of claim 8, wherein the one or more traffic indicators comprises a throughput, latency, and reliability (TRL) indicator, wherein the TLR indicator is calculated based on a data rate of the traffic of the first client device multiplied by a length of a time slice associated with the data rate.

11. The method of claim 8, wherein the one or more traffic indicators comprises a reliability indicator, wherein the reliability indicator is based on one or more of a packet error rate, a number of consecutive packet losses, a number of packets with delay or jitter above a predetermined target value, and a number of incidents of a number (n) consecutive packets with delay or jitter above a predetermined target value.

12. The method of claim 8, wherein the one or more traffic indicators comprises at least two traffic indicators, the at least two traffic indicators comprising a first traffic indicator associated with assigned radio resources for the first client device and a second traffic indicator associated with preferred assignment of radio resources by the first client device.

13. The method of claim 12, wherein the one or more traffic indicators comprises at least three traffic indicators, the at least three traffic indicators comprising a third traffic indicator based on a difference between values of the first traffic indicator and values of the second traffic indicator.

14. The method of claim 8, wherein the first RAT is a Wi-Fi RAT and the second RAT is a 5G-NR RAT.

15. A second wireless access point using a second radio access technology (RAT) in a heterogeneous wireless network including a first wireless access point using a first RAT and the second wireless access point, the second wireless access point comprising:
one or more interfaces configured to receive wireless transmissions;
a memory comprising instructions; and
a hardware processor;
wherein the second wireless access point, when executing the instructions at the hardware processor, is configured to:
receive, from the first wireless access point, at least one traffic indicator, wherein the at least one traffic indicator is based on performance characteristics of traffic management and traffic between the first client device and the first wireless access point using the first RAT and the second wireless access point using the second RAT;
extract one or more of the performance characteristics of the first client device between the first client device and the first wireless access point using the at least one traffic indicator; and
schedule radio resources for the first client device using the second RAT, wherein the resources are scheduled based at least on the at least one traffic indicator,
wherein the at least one traffic indicator comprises a throughout, latency, and reliability (TRL) indicator, wherein the TLR indicator is calculated based on a data rate of the traffic of the first client device multiplied by a length of a time slice associated with the data rate.

16. The second wireless access point of claim 15, wherein scheduling radio resources for the first client device comprises scheduling radio downlink resources, wherein scheduling downlink radio resources comprises one or more of:
estimating a number of downlink radio resource units or physical resource blocks to assign to the first client device in on the second RAT for random and scheduled access;
estimating a channel width for downlink radio resources to assign to the first client device;
estimating one or more parameters of downlink radio resource units or physical resource blocks assigned to the first client device;
calculate one or more bandwidth parts for the first client device for sending downlink data between the first RAT and the second RAT;
configuring a number of physical downlink control channels per slot; and
if the wireless device is a dual-mode user equipment, determining a split of downlink traffic across the first RAT and the second RAT.

17. The second wireless access point of claim 15, wherein scheduling radio resources for the first client device comprises scheduling uplink radio resources, wherein scheduling uplink radio resources comprises one or more of:
estimating a number of uplink radio resource units or physical resource blocks to assign to the first client device in on the second RAT for random and scheduled access;
estimating a channel width for uplink radio resources to assign to the first client device;
estimating one or more uplink parameters of resource units or physical resource blocks assigned to the first client device;
calculating one or more bandwidth parts for the first client device for sending uplink data between the first RAT and the second RAT;
configuring a number of physical downlink control channels per slot; and
if the wireless device is a dual-mode user equipment, determining a split of uplink traffic across the first RAT and the second RAT.

18. The second wireless access point of claim 15, wherein the one or more traffic indicators comprises a reliability indicator, wherein the reliability indicator is based on one or more of a packet error rate, a number of consecutive packet losses, a number of packets with delay or jitter above a predetermined target value, and a number of incidents of a number (n) consecutive packets with delay or jitter above a predetermined target value.

19. The second wireless access point of claim 15, wherein the one or more traffic indicators comprises at least two traffic indicators, the at least two traffic indicators comprising a first traffic indicator associated with assigned radio resources for the first client device and a second traffic indicator associated with preferred assignment of radio resources by the first client device.

20. The second wireless access point of claim 19, wherein the one or more traffic indicators comprises at least three traffic indicators, the at least three traffic indicators comprising a third traffic indicator based on a difference between values of the first traffic indicator and values of the second traffic indicator.

21. A method in a second wireless access point using a second radio access technology (RAT) in a heterogeneous wireless network including a first wireless access point using a first RAT and the second wireless access point, the method comprising:
receiving, from the first wireless access point, at least one traffic indicator, wherein the at least one traffic indicator is based on performance characteristics of traffic management and traffic between a first client device and the first wireless access point using the first RAT and the second wireless access point using the second RAT;
extracting one or more of the performance characteristics of the traffic management and the traffic of the first client device between the first client device and the first wireless access point using the at least one traffic indicator; and
scheduling radio resources for the first client device using the second RAT, wherein the resources are scheduled based at least on the at least one traffic indicator,
wherein the at least one traffic indicator comprises a throughput, latency, and reliability (TRL) indicator, wherein the TLR indicator is calculated based on a data rate of the traffic of the first client device multiplied by a length of a time slice associated with the data rate.

22. The method of claim 21, wherein scheduling radio resources for the first client device comprises scheduling radio downlink resources, wherein scheduling downlink radio resources comprises one or more of:
estimating a number of downlink radio resource units or physical resource blocks to assign to the first client device in on the second RAT for random and scheduled access;
estimating a channel width for downlink radio resources to assign to the first client device;
estimating one or more parameters of downlink radio resource units or physical resource blocks assigned to the first client device;
calculating one or more bandwidth parts for the first client device for sending downlink data between the first RAT and the second RAT;

configuring a number of physical downlink control channels per slot; and if the wireless device is a dual-mode user equipment, determining a split of downlink traffic across the first RAT and the second RAT.

23. The method of claim 21, wherein scheduling radio resources for the first client device comprises scheduling uplink radio resources, wherein scheduling uplink radio resources comprises one or more of:

estimating a number of uplink radio resource units or physical resource blocks to assign to the first client device in on the second RAT for random and scheduled access;

estimating a channel width for uplink radio resources to assign to the first client device;

estimating one or more uplink parameters of resource units or physical resource blocks assigned to the first client device;

calculating one or more bandwidth parts for the first client device for sending uplink data between the first RAT and the second RAT;

configuring a number of physical downlink control channels per slot; and if the wireless device is a dual-mode user equipment, determining a split of uplink traffic across the first RAT and the second RAT.

24. The method of claim 21, wherein the one or more traffic indicators comprises a reliability indicator, wherein the reliability indicator is based on one or more of a packet error rate, a number of consecutive packet losses, a number of packets with delay or jitter above a predetermined target value, and a number of incidents of a number (n) consecutive packets with delay or jitter above a predetermined target value.

25. The method of claim 21, wherein the one or more traffic indicators comprises at least two traffic indicators, the at least two traffic indicators comprising a first traffic indicator associated with assigned radio resources for the first client device and a second traffic indicator associated with preferred assignment of radio resources by the first client device.

26. The method of claim 21, wherein the one or more traffic indicators comprises at least three traffic indicators, the at least three traffic indicators comprising a third traffic indicator based on a difference between values of the first traffic indicator and values of the second traffic indicator.

\* \* \* \* \*